United States Patent
Uy

[11] Patent Number: 5,724,885
[45] Date of Patent: Mar. 10, 1998

[54] SPATTER SHIELDING AND VAPOR VENTING DEVICE FOR FRYING PAN

[76] Inventor: William Cheng Uy, 621 Parkridge Dr., Hockessin, Del. 19707

[21] Appl. No.: 791,761

[22] Filed: Jan. 29, 1997

[51] Int. Cl.⁶ .............. A23L 1/00; A47J 27/00; A47J 37/10; B65D 1/40
[52] U.S. Cl. .............. 99/341; 99/422; 99/645; 126/299 C; 126/383; 220/369; 220/731
[58] Field of Search .............. 99/341, 347, 422, 99/423, 645; 126/299 C, 373, 381, 383; 366/347; 220/731, 366.1, 369, 370, 661–663, 676, 912

[56] References Cited

U.S. PATENT DOCUMENTS

| | | | |
|---|---|---|---|
| 656,855 | 8/1900 | Pimlott | 99/347 |
| 1,682,095 | 8/1928 | Reyther | 126/299 C |
| 2,148,181 | 2/1939 | Andreolo | 126/383 |
| 2,488,215 | 11/1949 | Mayne | 99/341 |
| 2,496,121 | 1/1950 | Dement et al. | 126/299 C |
| 2,506,957 | 5/1950 | Gomez | 220/231 |
| 2,611,510 | 9/1952 | Willits | 220/731 |
| 2,614,718 | 10/1952 | Loop | 99/422 X |
| 2,680,532 | 6/1954 | Mitchell | 126/299 C |
| 4,000,830 | 1/1977 | French | 220/369 |
| 4,700,689 | 10/1987 | Speker | 220/369 |
| 5,542,347 | 8/1996 | Joseph | 99/422 |
| 5,555,994 | 9/1996 | Chen | 99/645 X |

*Primary Examiner*—Timothy F. Simone

[57] ABSTRACT

An improved spatter shielding and vapor venting device for a frying pan comprising a transparent lid to enable visual observation of cooking, a peripheral venting gap to release generated fumes and vapors, a vertical hollow cylindrical wall to rapidly return condensed oil to frying pan, a handle to hold the device steady, a peripheral horizontal flange and size expansion adapter to facilitate placement on rims of frying pans of varying sizes, a vertical cylindrical flange to restrict lateral motion and to shield the contact area between the horizontal flange and frying pan rim, a vertical window opening for the introduction, removal, stirring and turning over of food, a hands-free opening and automatic closing window cover means to effectively shield the window opening even while performing said cooking operations, a loop-and-pin hinged system to facilitate stuck-proof withdrawal of inserted instrument through said window opening.

8 Claims, 5 Drawing Sheets

SPATTER SHIELDING AND VAPOR VENTING DEVICE FOR FRYING PAN

BACKGROUND OF THE INVENTION

1. Field of Invention

The present invention relates to an improved spatter shielding and vapor venting device for a frying pan, and more particularly to a device that is placed on the rim of a frying pan and covering the entire open surface area of the frying pan, said device being provided with a transparent lid for visual observation of the cooking process; a vertical hollow cylinder for rapid return of condensed oil into the frying pan; a handle attached to the said hollow cylindrical wall for holding steady the hot device; a peripheral horizontal flange to facilitate placement on the rim of a frying pan of varying sizes; a size expansion adapter to fit larger size frying pan than that designed for by said device; a vertical bottom cylindrical flange for preventing lateral motion and for shielding the contact area between the peripheral horizontal flange and the rim of a frying pan from spattering liquids; diameter of said vertical hollow cylinder being larger than the diameter of said vertical bottom cylindrical flange; said vertical hollow cylinder, said peripheral horizontal flange and said vertical cylindrical flange capable of being formed from a single piece of material; a vertical window opening in the vertical hollow cylindrical wall for the introduction and removal of food or for the insertion of an instrument to stir or turn over food; a cover for said vertical window opening that provides maximum shielding through a hands-free opening and automatic closing mechanism for preventing the escape of spatters even during the performance of said cooking operations; a hinged system that provides for stuckproof removal of any inserted instrument; and a peripheral venting gap between the lid and the top rim of the vertical cylindrical wall for discharging vapors generated during the frying process.

2. Prior Art

During a normal course of food frying process utilizing oil or fat, the contact of moisture containing food with the hot oil or fat produces extreme spattering of the liquids and food particles out of the frying pan to considerable distance, thereby not only messes up stove tops and surrounding surfaces but also creates an undue hazard to nearby people. The problems of grease fires in the kitchen as well as severe burns to people are well documented. In order to contain the spattering of hot liquids and solids and also to obviate a major safety hazard and messiness in the kitchen, the conventional means is to use a typical sauce pan cover. There are several problems with this sauce pan cover. First, most sauce pan covers are not transparent to enable the observation of the interior of the frying pan; second, there is no venting means to discharge the vapors generated during the frying process; third, the covers have to be removed to enable various cooking operations such as the introduction, removal, stirring or turning over of food. Since the wall of a frying pan is very low and typically 1 to 2 inches, even a partial opening of the sauce pan cover exposes large unshielded peripheral opening through which spatters can escape. Therefore, there have been several methods mentioned in the prior art addressing these problems, the most challenging of which is preventing spatters from escaping out of the frying pan during performance of said various cooking operations.

For examples: a shielding screen cover that is flat or convex with a circular rim (U.S. Pat. Nos. 2,498,534; 3,807,596; 4,108,332); a conical cover made with circular tiers of vent slots (U.S. Pat. No. 534,138); a flat plate cover with a center hole for venting, over which is another flat plate (U.S. Pat. No. 2,510,196); a dome-shaped lid cover with venting holes on side and top (U.S. Pat. No. 2,867,352); hinged covers are described in the following U.S. Pat. Nos. 2,350,243; 2,587,773; 4,258,694; 4,403,711. However, while some of these methods provided for venting or the convenience of the covers being hinged and not needing a second hand to hold them open, all of them provided shielding only if they are to remain in place and are not much more effective in preventing the escape of spatters as the typical sauce pan covers because they have to be removed or be held partially opened to perform any of said cooking operations.

The following patents address the need for performing said cooking operations without having to remove the device by providing a window opening in the device: Canada Pat. No. 466,473; U.S. Pat. Nos. 333,894; 1,722,513; 168,026; 2,198,158; 2,629,511; 2,680,532; 3,999,680. However, because of the unshielded window opening, they provide only partial protection. Furthermore, the first three patents teach the method wherein the device houses the entire frying pan and including the heat source. Because spattered and condensed hot oil and moisture do not drip back to the fry pan but to the bottom of the device and are in the vicinity of the heat source, there is the danger of starting a dangerous grease fire. Additionally, the hot oil fumes filling the inside of the device presents a very dangerous explosive fire hazard. This is specially so if the heat source is an open flame.

U.S. Pat. Nos. 1,807,271; 2,623,516; 3,082,566 further improve the above mentioned prior art by providing a protective cover for the window opening. Venting of gases is provided in the first patent by having vent holes and in the third patent venting is through screens. However, since these three methods also house the entire frying pan and the heat source, they suffer the same danger of oil dripping to the bottom of the device nearing the heat source and corresponding fire hazard. Although a trough is provided at the bottom of the device in the first patent to contain condensed liquids, the liquids' close vicinity to the heat source and overflow potential present the same kind of fire danger as described in previous paragraph. Actually, the explosive fire hazard from trapped oil fumes is more serious with these methods than those devices in the preceding paragraph wherein the window opening has no cover so that there is less trapped oil fumes.

The following prior art attempt to eliminate all of the above deficiencies and is partially but more successful than most prior art in preventing the escape of spatters during the performance of said cooking operations; none of these devices house the heat source; all have also incorporated some means for venting of vapors: Great Britain Pat. No. 25,606; U.S. Pat. Nos. 504,319; 2,614,718; 3,857,381; 4,266,527. These provide a window opening and a protective window cover which can be opened to perform said cooking operations and is closed when not in use. However, all of the windows are at an incline toward the center of the frying pan and since a substantial portion of spattering is directed upward, the greater the incline or the smaller the angle the plane of the window made with the horizontal, the greater the amount of spattering is thrown outside the frying pan when the window cover is opened for the purpose of performing said cooking operations. Furthermore, the window cover has to be opened manually. Still furthermore, if the window cover is to be held partially open for providing partial shielding of the windows during the performance of said cooking functions, a second hand is needed to hold the window cover. This second hand and its arm are therefore brought into close proximity of the hot vapors and spatters shooting out of the partially opened window and are thereby being put into danger of getting burned. And still furthermore, with both hands so preoccupied, there are no hand left to steady the device for holding on to the body of the device specially during stirring of food. Without holding steady the device, the device can be accidentally lifted up from the frying pan by a turner used to perform those cooking operations and thereby creating undue hazards. The British Pat. No. 25,606 describes a truncated oblique conical hood with a hinged or removable cover over an inclined window. The plane of the window in U.S. Pat. No. 504,319 is horizontal and represents the worst case. Furthermore, in order to provide a sufficient and complete observation of the cooking process specially during the removal or stirring of the food, the window cover needs to be completely opened as there are no transparent portion provided in the first three patents. Additionally, the U.S. Pat. No. 2,614,718 provides a device that sits on the bottom of a frying pan and therefore does not completely cover the entire open area of the fry pan. In deep frying, the hot oil or fat can not be completely contained within the device and flows outside of the device and is unprotected. Furthermore, in the U.S. Pat. Nos. 3,857,381 and 4,266,527, a frying pan is an integral part of the art and the protective hood can not be used with any conventional frying pan.

In U.S. Pat. No. 5,531,354 of this inventor, all the above mentioned problems and deficiencies are successfully solved. The device, however, can prove to be difficult, and therefore, expensive to fabricate commercially because there are many parts that need to be put together. Additionally, its top access opening is limited by the diameter of the vertical hollow cylinder, which is limited by the diameter of the frying pan. In the device where the window cover is a hinged and swinging cover, any general hinged system will permit the window cover to hang and swing freely. However, the typical hinge connects two parts together at a joint with a pin forming the fulcrum, permits each part to rotate about its fulcrum. Thus the only motion is rotation. An example is the common piano hinge. An inserted instrument, such as a turner or spatula, upon withdrawal can get wedged and stuck between the bottom of the window cover and the edge of the horizontal cover at the bottom of the window opening. It would require an upward lifting motion to unstuck the instrument. While it was found that certain turners, where its blade and handle are formed in one piece rather than being jointed together and its thickness gradually decreases down to the blade, do not get stuck as described. The problem is that there is no control over what people may or may not use as a turner or other instrument. Therefore, there is a safety concern that some people may yank at the stuck instrument too forcefully so as to pull the whole device and hot frying pan toward themselves. Furthermore, the typical hinge, such as the piano hinge, has numerous crevices in the joint where grease and fine food particles can get lodged and are difficult to be cleaned and can eventually tighten the joint and prevent the cover from swinging freely to completely cover the window opening. Therefore, there is a need for a unique hinged system that would prevent a turner or other inserted instrument from getting wedged and stuck and also easy to clean. Still furthermore, while it is possible to design said device to fit all sizes of frying pan, such a device would have to have a vertical cylindrical flange with diameter equal to the smallest frying pan size of about 6.5 inches (16.5 cm.) and a peripheral horizontal flange whose width is at least 5.5 inches (14.0 cm.) in order to fit up to the largest 12-inch diameter frying pan. Such a one-size-fits-all device would be lacking in aesthetics, has a small top access opening and would have too much lateral motion especially if used on a large frying pan. The actual inside diameter of a frying pan for a specified size varies depending on the manufacturers. For example, for a 10-inch (2.54 cm.) size frying pan, the measured inside diameter of different brands ranges from 9.24 inches (23.5 cm.) to 10.0 inches (25.4 cm.). An aesthetically pleasing device of this invention with said peripheral horizontal flange 9 having a narrow but sufficient width can fit within these small variations in diameter for each sized pan. In order to maintain aesthetics and to fit much larger size frying pans, a separate means is needed to accomplish the fit.

In the present improved device, all of these problems and deficiencies are successfully solved.

SUMMARY OF THE INVENTION

An object of the present invention is to prevent hot solids and liquids from being thrown out of a frying pan by providing a shielding device that covers the entire open surface area of a frying pan.

Another objective of the present invention is to facilitate visual observation of the cooking process by providing a transparent lid.

A further objective of the present invention is to facilitate rapid return of the condensed oil back into the frying pan by providing a vertical hollow cylindrical wall.

A still further objective of the present invention is to prevent accidental lifting up and detachment of the hot device from a frying pan by providing a handle for holding onto.

A still further objective of the present invention is to facilitate placement of the device on the rims of frying pans of varying sizes by providing for a peripheral horizontal flange of sufficient width on the bottom end of the vertical hollow cylindrical wall.

A still further objective of the present invention is to restrict lateral motion of the device and also to shield the peripheral contact area between the rim of the frying pan and the peripheral horizontal flange from oil splashes by providing a vertical bottom cylindrical flange of appropriate height below the peripheral horizontal flange and is of appropriate diameter so that it is smaller than the inside diameter of a frying pan.

A still further objective of the present invention is to facilitate the cooking operations of introducing, removing, stirring, and turning over of food with maximum shielding of the window opening and without the need of a hand to open, close or hold partially open the window cover by providing a vertical window in the vertical hollow cylindrical wall and a hands-free opening and automatic closing window cover.

A still further objective of the present invention is to facilitate the release of vapors by providing a peripheral venting gap between the lid and the top rim of the vertical hollow cylinder and shielding the venting gap from spattering by a vertical cylindrical flange on the bottom of the lid; said vertical cylindrical flange also restricts lateral motion of the transparent lid.

A still further objective of the present invention is improvement made to facilitate efficient fabrication of the device and to make the top access opening independent of frying pan size by providing said peripheral horizontal flange attached to and extending radially inwardly from the bottom of said hollow vertical cylinder and attached to the top rim of said vertical bottom cylindrical flange.

A still further objective of the present invention is additional improvement made to provide an aesthetically pleasing device to fit larger diameter frying pans by providing a size expansion adapter.

A still further objective of the present invention is additional improvement made to prevent any inserted instrument from getting wedged and stuck and also to provide an easy to clean hinged system by providing a hinged system comprising of loop hanging on pin.

DETAILED DESCRIPTION OF THE INVENTION

The improved spatter shielding and vapor venting device of the present invention is shown generally by the letter L for the lid, which sits on top of a vertical hollow cylinder W, which has a vertical window opening that is shielded by a cover C.

Figure 1:
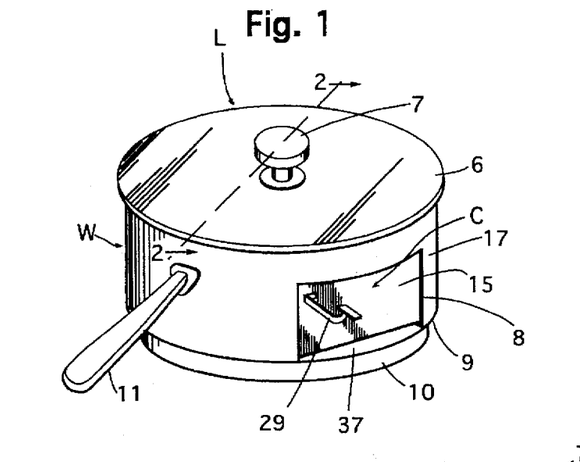
FIG. 1 is a perspective view of the present invention.
Figure 2:
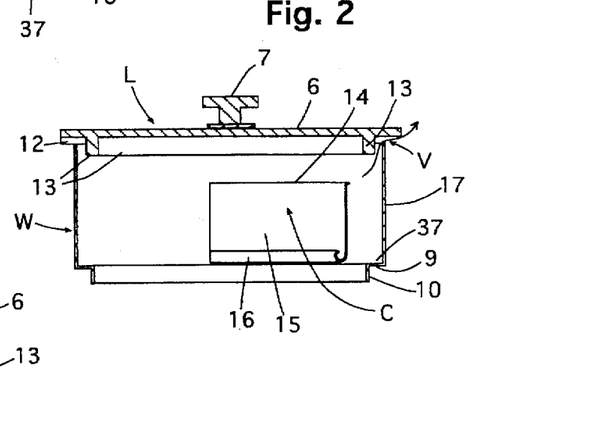
FIG. 2 is a vertical cross section taken along line 2—2 of FIG. 1 and view in the direction of the arrows.
Figure 3:
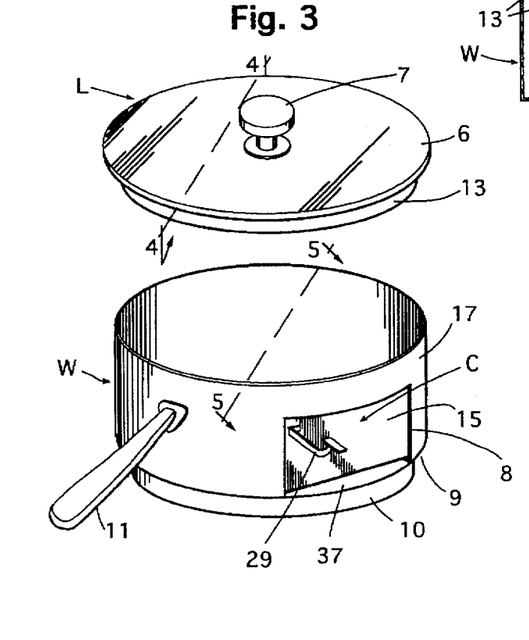
FIG. 3 is an exploded view of FIG. 1.
Figure 4:
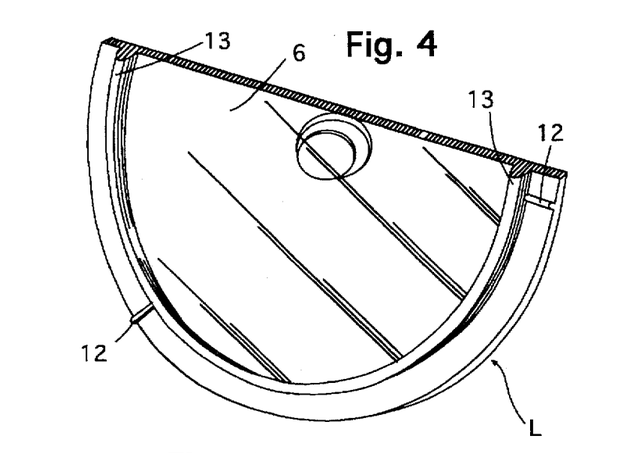
FIG. 4 is a vertical cross section taken along line 4—4 of FIG. 3 and view at an oblique angle the bottom of the lid in the direction of the arrows.

As shown in FIGS. 1 and 2, the lid L has a knob 7 attached to a transparent circular lid member 6, preferably made of glass, to facilitate visual inspection of the interior of said vertical hollow cylinder W. The diameter of said lid member 6 is appropriately larger than the diameter of said vertical hollow cylinder W and said lid member 6 rests on the top rim of said vertical hollow cylinder W on at least three radial ridges 12, as shown in FIGS. 2 and 4, forming a peripheral venting gap V between said lid member 6 and the top rim of said vertical hollow cylinder W. Another embodiment for forming the peripheral venting gap V without said radial ridges 12 on said lid member 6 is to have at least three bumps on the rim of said vertical hollow cylinder W. The vertical cylindrical flange 13 on the bottom face of said lid member 6 shields the venting gap V from spatters and its height is taller than said radial ridges 12 to restrict lateral motion of the lid L. A curve vapor path way is shown by a curved arrow in FIG. 2.

A handle 11 is preferably attached to the vertical cylindrical wall 17 of said vertical hollow cylinder W to provide a means for holding the hot device steady during the performance of those cooking operations as in the introduction, removal, and specially during the stirring or turning over of food.

Located at the bottom end of said vertical hollow cylinder W are the peripheral horizontal flange 9, which with appropriate width can sit on the rim of frying pans of various sizes, and the vertical bottom cylindrical flange 10, which prevents excessive lateral motion of the device and whose diameter is preferably smaller than the inside diameter of a frying pan so as to shield from spatters the contact area between said peripheral horizontal flange 9 and the rim of the frying pan. Said peripheral horizontal flange 9 is attached to the bottom end of said vertical hollow cylinder W and extends radially inward to the top rim of said vertical bottom cylindrical flange 10. With this design, the diameter of the said vertical hollow cylinder W can be made larger than the diameter of said vertical bottom cylindrical flange 10 to provide for larger top access opening. Furthermore, with this design, said peripheral horizontal flange 9 provides an inside peripheral horizontal ledge 37, which can support a dripping tray for fried food in order to drain off excess oil while keeping the food warm. Still furthermore, said peripheral horizontal ledge 37 automatically covers the exposed area between the lower portion of said cover C and said wall 17 at the bottom of the vertical window opening 8, without the need for a separate piece of cover. And still furthermore, the complete assembly of said vertical hollow cylinder W, said peripheral horizontal flange 9 and said vertical bottom cylindrical flange 10 in this improved invention can be efficiently made from a single piece of material, for example, drawn from a single piece of plate or molded from a single piece of tubing. Many useful inventions are not brought to the market due to difficulty and high expense in manufacturing.

Figure 5:
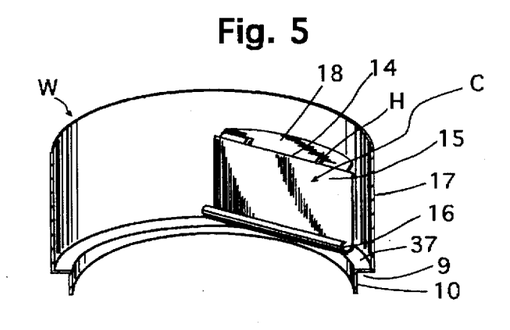
FIG. 5 is a vertical cross section taken along the line 5—5 of FIG. 3 and view at an oblique angle in the direction of the arrows.
Figure 6:
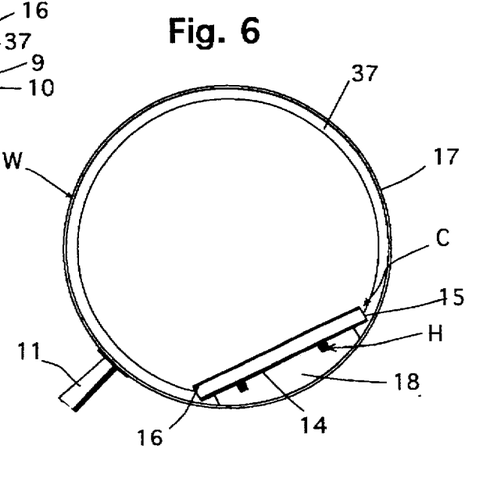
FIG. 6 is a top view of FIG. 1 without the lid.

The said vertical window opening 8 in said wall 17 provides the means for performing said cooking operations. The vertical orientation of the curve plane of said window opening 8 presents the least exposure to the spattering surface of a frying pan in comparison to those window openings of equal area inclined toward the inside of a frying pan. The vertical window opening 8 is shielded by a cover C consisting of a vertically hanged cover 15, whose top edge 14 is preferably attached through a hinged system H to a horizontal member 18, as shown in FIG. 5, which is attached to the inside of said vertical wall 17 over the top of said vertical window opening 8. Said cover C hinged system can also be attached to said vertical wall 17. Such manner of attachment is made clearer in the description below about the hinged system. Said window cover 15, being hung vertically by gravity, is not restricted to swing freely about its hinged system H and can be pushed in to swing open with very little force by any instrument such as a turner or spatula without manually opening it. Said window cover 15 at its naturally gravity hanged position completely shields said window opening 8. Additionally, since the bottom edge of said window cover 15 always rests on the handle of an inserted instrument, said cover 15 is only minimally opened depending on how far the instrument is inserted, thus exposing the bare minimum of said window opening 8. The said window cover 15 will automatically open and close, without any spring mechanism, with the forward and backward movement of the inserted instrument and with very little friction between the instrument and said cover 15 due to the complete weightlessness of the hanged cover. The simplicity of this design also means less things to go wrong or break down. The bottom edge of said cover 15 is preferably curl as shown by bottom edge 16, as shown in FIGS. 2 and 5, so as to prevent catching the edges of an inserted sectional instrument. The instrument can be withdrawn from said covered window opening 8 just as easily as it is inserted without the need of another hand to open the window cover. If the overall size of said cover 15 is smaller than the window opening, said cover 15 can also swing open in the backward or out direction thus facilitating also a hands-free removal of food but at a minor sacrifice to the efficiency of shielding said window opening 8. Otherwise, a handle 29 for said cover 15 is provided to hold said cover 15 opened when food is being removed.

Figures 9, 10, 11, 12:
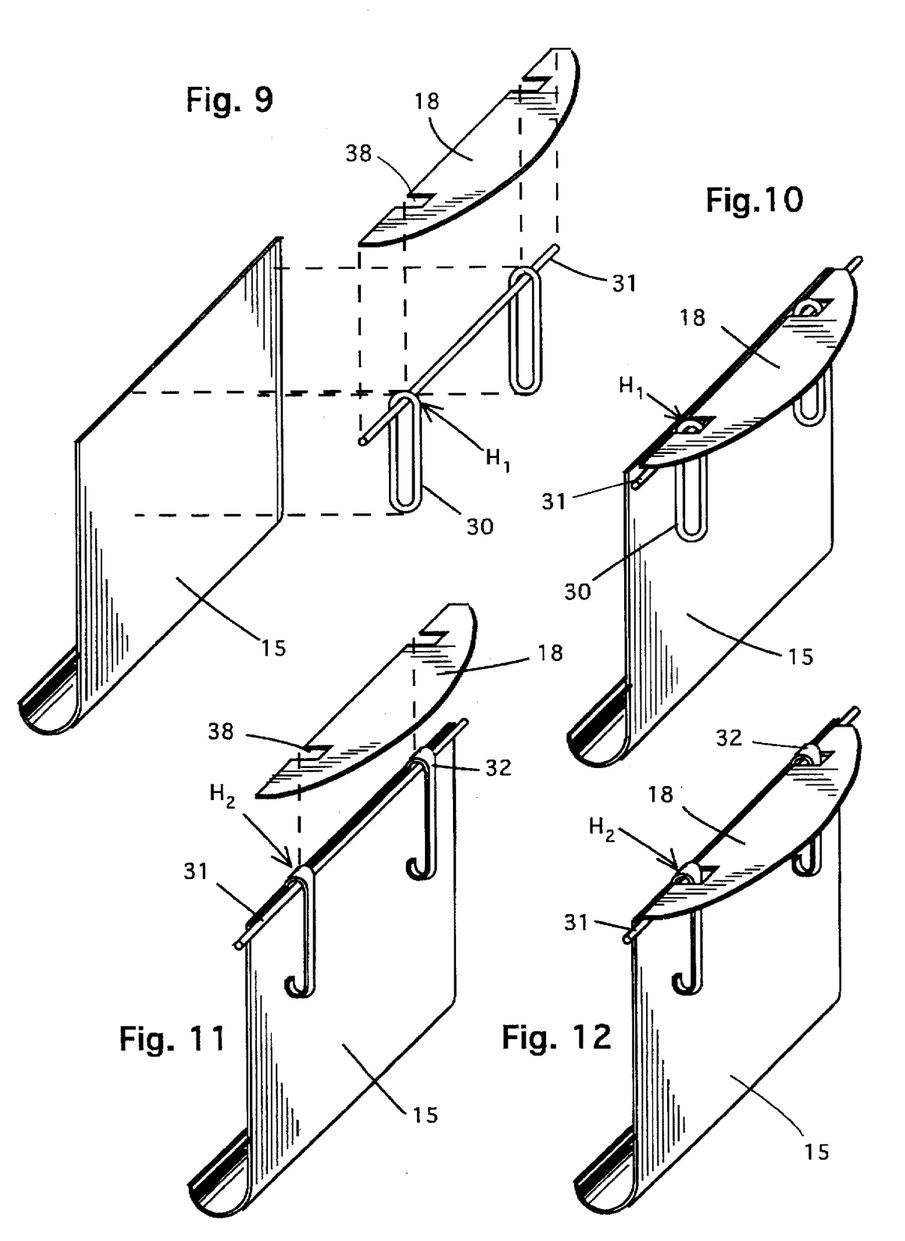
FIG. 9 is an exploded view of FIG. 10.
FIG. 10 is a perspective view of the hinged swinging window cover system and showing the hinged system with closed elongated loops.
FIG. 11 is an exploded view of FIG. 12.
FIG. 12 is a perspective view of the hinged swinging window cover system and showing the hinged system with closed loops, which are integral parts of said window cover.
Figure 13:
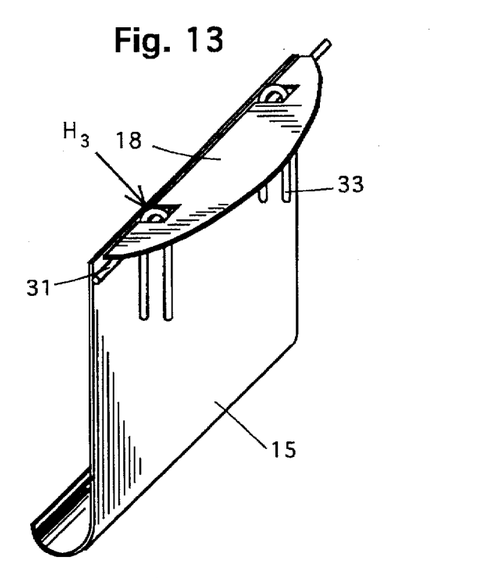
FIG. 13 is a perspective view of the hinged swinging window cover system similar to FIG. 10 except with opened loops.
Figure 14:
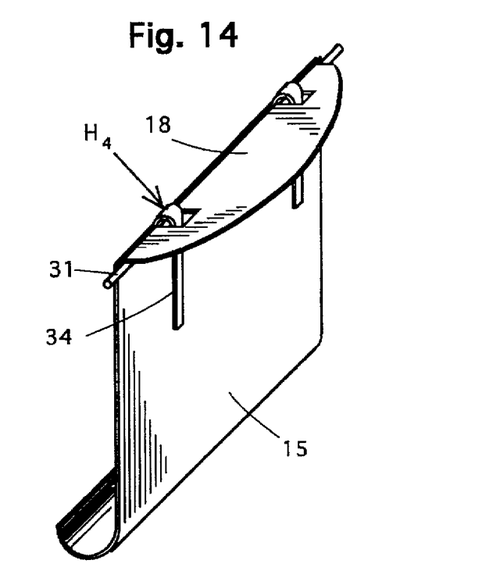
FIG. 14 is a perspective view of the hinged swinging window cover system similar to FIG. 12 except with opened loops.

A unique hinged system H, shown in FIGS. 9 to 14, comprising of a loop hanging on a pin provides not only a rotation motion but also a linear vertical motion. It is this linear vertical motion that prevents any inserted instrument from getting wedged and stuck. In a common hinged system, where rotation is the only motion, when a wedged instrument is pulled harder, it would get stuck tighter. However, with said hinged system H, said cover 15 can move upward thus preventing the instrument from getting stuck. FIG. 9 shows two of the unattached hinged system $H_1$ comprising of a closed loop 30 and a pin 31. The preferred embodiment is shown with two hinged systems $H_1$ sharing a common pin. In other embodiments, the said window cover 15 can have at least two hinged systems. The attachment of said hinge system $H_1$ is done by first attaching a vertical side of said loops 30 to said cover 15 appropriately aligning the top of said loop 30 to as high as the top edge of said cover 15, followed by the insertion of said pin 31 through said loop 30, and further followed by attaching said pin 31 to the underside of said horizontal member 18 taking care that said loop 30 protrudes through the opening 38 in said horizontal member 18. FIG. 10 shows the completely assembled unit. A common pin 31 is preferable when using multiple hinged systems such as shown in FIGS. 9 to 14. When a common pin 31 is used, an alternate attachment means for the hinged system, instead to said horizontal member 18, can be made by attaching the ends of said common pin 31 to the inside of said wall 17. In another embodiment, the closed loop 30 is an integral part of said cover 15 rather a separate part that requires an additional attachment step. This is shown as closed loop 32 in FIGS. 11 and 12. The hinged system $H_2$ function similarly as said hinged system $H_1$. The hinged systems $H_3$ and $H_4$ contain opened loops 33 and 34 and are shown in FIGS. 13 and 14. The opened loops hinged systems function like the said closed loops hinged systems $H_1$ and $H_2$ with the additional advantage, since the bottom of the loops is opened, that the said cover 15 can be lifted up and detached from said hinge pin 31. This detachable feature facilitates easier cleaning of said cover 15.

Figure 15:
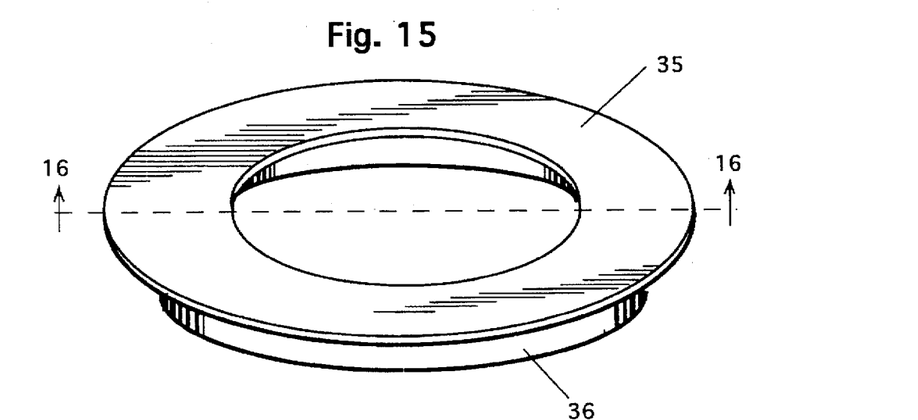
FIG. 15 is a perspective view of the size expansion adapter ring.
Figure 16:
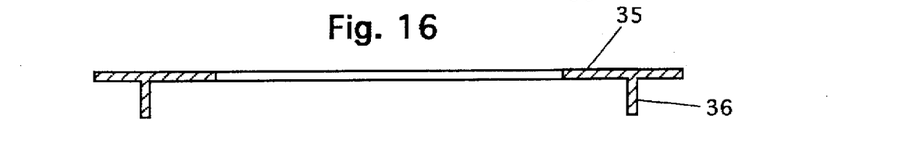
FIG. 16 is a vertical cross section of FIG. 15 taken along line 16—16 and viewed horizontally.

The size expansion adapter is shown in FIG. 15. The inside diameter of the horizontal annular disc 35 is made appropriately smaller to fit the outside diameter of said vertical bottom cylindrical flange 10 and the outside diameter of said horizontal annular disc 35 is wider than the outside diameter of a larger size frying pan. The vertical bottom cylindrical flange 36 of said annular disc 35 prevents lateral motion and has a diameter appropriately smaller than the inside diameter of the larger size frying pan for which it intends to fit.

Accordingly, when the improved spatter shielding and vapor venting device of the present invention is mounted over a frying pan, food for frying can be loaded on top of an instrument, such as the blade of a turner, and introduced into the frying pan by gently pushing open said cover 15 with the front end of the instrument. Since said cover 15 is hanged and is practically weightless, the food on top of the instrument can be inserted deep inside said device without being scraped off from the instrument by said cover 15 and caused to be dropped onto the frying pan by rotating the instrument. Stirring can commensurate using the instrument and since said cover 15 leans on the handle of the instrument, only the barest window opening is exposed to spatter at all times. The instrument can be moved with ease anywhere within said window opening. However, most effective shielding protection against spatters escaping out is achieved by keeping said instrument close to the lower edge of said window opening. When said instrument is withdrawn, said cover 15 automatically swings close. It is recommended that said handle 11 be used to hold steady the device with the other hand during said cooking operations to prevent accidental lifting up of said device from the frying pan. The cooking process can be visually monitored through the transparent lid L. Meanwhile, generated oil fumes and water vapor make their way out the peripheral venting gap V, formed between the lid L and top rim of the hollow cylinder W. To use said device on a larger size frying pan, said size expansion adapter in FIG. 15 is first mounted over the frying pan, then said device is placed over said size expansion adapter.

Figure 7:
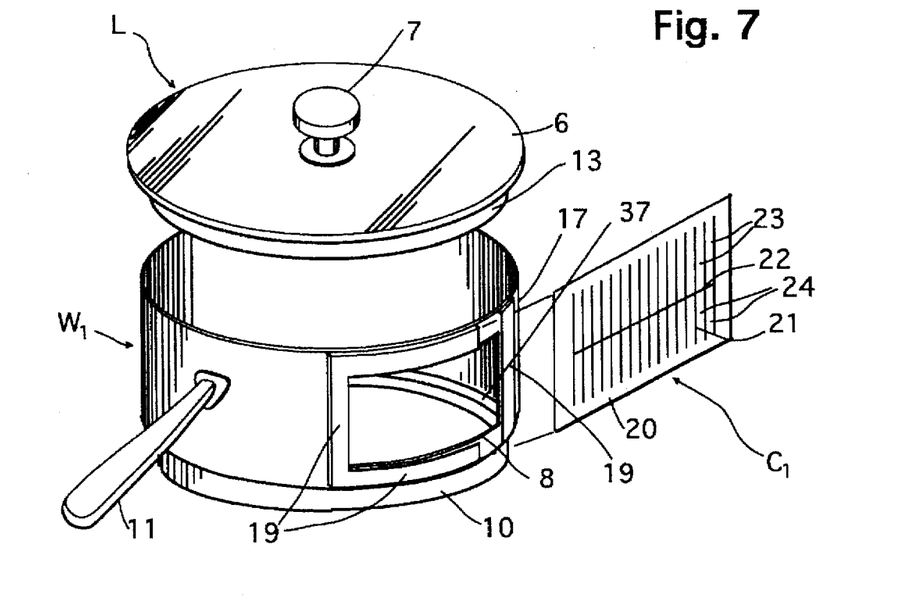
FIG. 7 is a perspective view showing another embodiment related to the present invention and showing the exploded view of the film strips window cover.

Furthermore, FIG. 7 shows another embodiment illustrating the hands-free opening and automatic closing cover $C_1$, which is composed of: a curtain of strips of material mounted around the window opening. The curtain is formed of fabric, plastic film or other suitable resilient material. While a solid curtain of soft and drape-able material may provide shielding protection, it is not a preferred method because when an instrument is inserted and lifted up, the whole curtain is lifted up versus a selected few strips that are in contact with the instrument leaving the remaining strips still providing shielding protection. A preferred embodiment of the window cover $C_1$ is shown in FIG. 7 and comprises: a film 20 slitted at the indicated vertical lines 21 and horizontal line 22 resulting in vertically hanging strips 23 and vertical standing strips 24; slots 19 along the outside perimeter of said window opening 8 except for two breaks on the top and bottom horizontal slot as shown. Said slots 19 are attached at their outer most perimeter to wall 17. The film is preferably made of flame-proof resilient materials, such as polyimides, and is sufficiently stiff for the vertical standing strips 24 to stay upright without bending. While the film can be slitted along other directions to form strips at other angles, the vertical strips are preferred as they provide a better shielding of the window opening since the vertical strips can follow the vertical curve plane of the window opening. With horizontally aligned strips, the stiff strips will stick out tangential to the curve window plane at the attached end of the circular cylindrical wall 17. The two sectional vertical strips 23 and 24 described above in the preferred embodiment are more efficient than continuous vertical strips in providing shielding of the window opening specially when an inserted instrument is being moved about within the opening. For example, when continuous vertical strips are attached on top of the window opening and an instrument is inserted and raise all the way up, the area of exposed window opening will be equal to those vertical strips that were pushed out of the way. However, with the two sectional vertical strips, only said top vertical strips 23 are pushed out of the way but said vertical bottom strips 24 are still in place, therefore the area of exposed window opening is 50% less. The bending resistance of the vertical strips can be made extremely low by using appropriately thin film thickness and narrow strip width. When in use, the slitted film 20 is inserted into the slots 19 along the direction of the dotted lines and the right edge of slitted film 20 is tugged into the right side vertical slot 19. The spatter shielding and vapor venting device is mounted on a frying pan. Food can be introduced into the frying pan by simply inserting the food laden instrument through the slitted film 20. The extremely low bending resistance of the slitted film 20 allows the food laden instrument to be inserted without the food being swept off the instrument and the food caused to be dropped onto the frying pan by rotating the instrument. Only those vertical strips touching the instrument and food will bend but they stay in contact at all times so that only the barest window opening is exposed. Once any film strip lost contact with the instrument or food it immediately and automatically returns to its original close position sealing the window opening. Stirring can commensurate using the instrument and the instrument can be moved with practically no resistance anywhere within the window opening. The instrument can be withdrawn just as easily, hands-free, and all said strips 23 and 24 of said slitted film cover 20 will automatically return to their closed positions. Improved shielding protection can be made using at least two layers of slitted films with the film strips of the second layer covering the lines of cut of the first layer. This is accomplished by moving to either left or right the vertical lines of cut a distance equal to the half width of the individual film strip and the single horizontal line of cut can be moved either up or down an appropriate distance.

Decreasing the width and increasing the thickness of the individual film strips turn them into bristles. Thus, another embodiment illustrating the hands-free and automatic closing window cover is a dense layer of bristles pointing similarly as the film strips toward the center of the window opening.

Figure 8:
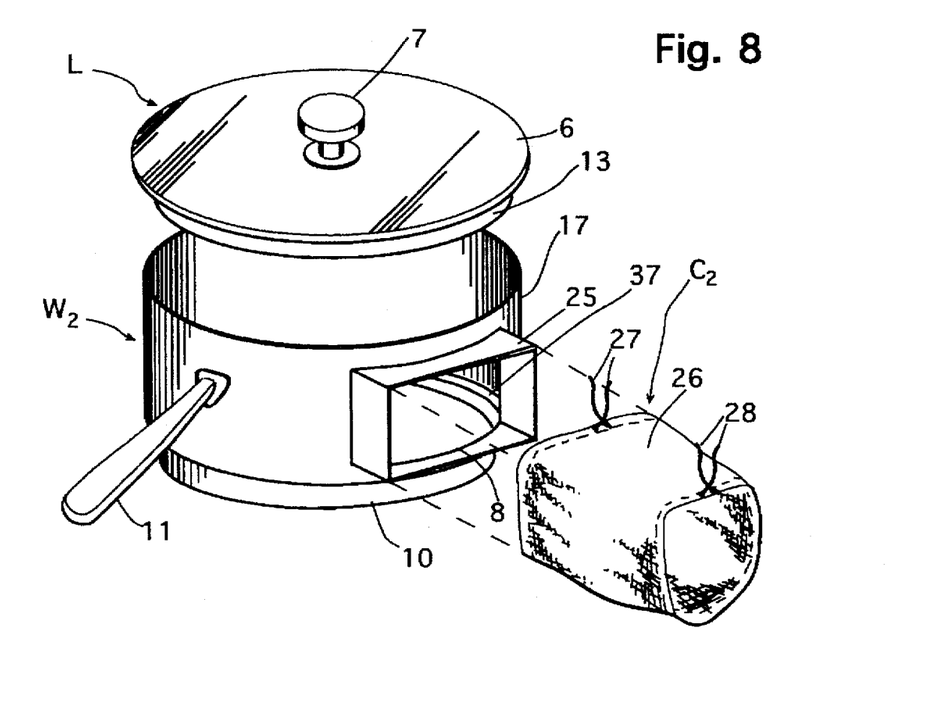
FIG. 8 is a perspective view showing another embodiment related to the present invention and showing the exploded view of the fabric sleeve window cover.

And still furthermore, FIG. 8 shows another embodiment illustrating the hands-free opening and automatic closing window cover $C_2$, which also facilitates complete movement of an inserted instrument within the window opening and yet providing complete shielding protection against spatters from escaping out in any location within the window opening. The window cover $C_2$ is composed of: a fabric sleeve 26 with draw strings 27 at the front end and draw strings 28 at the rear end; a shroud 25 attached to the wall 17 around the perimeter of window opening 8. The fabric sleeve 26 and draw strings 27 and 28 are preferably made of nonflammable material such as glass fiber. Another embodiment of said draw strings 27 can be an elastic band to facilitate attachment to said shroud 25. The length of said fabric sleeve 26 is preferably equal to the width of the window opening plus the depth in which said fabric sleeve 26 is attached to the shroud so as to allow the instrument to move without physical restriction within the whole window opening. While FIG. 8 shows the embodiment of a pair of rear draw strings 28, they are not necessary if the length of said fabric sleeve 26 is of sufficient length such that with its top side of the sleeve draping down and the extension of the sleeve rear opening, the resulting rear opening of the fabric sleeve is no longer exposed to the spattering trajectories. The front perimeter edge of said shroud 25 preferably has some means of holding the fabric sleeve to prevent it from sliding off, for example, a raise perimeter lip or hooks placed appropriately around the perimeter. When in use, the front end of said fabric sleeve 26 is wrapped around said shroud 25 and said draw strings 27 are drawn tight. The spatter shielding and vapor venting device is mounted onto a frying pan. Food is introduced with a food laden instrument inserted through said sleeve 26 rear opening. When said fabric sleeve 26 is of appropriate length, the top side of the sleeve is sufficiently draped down on and around the instrument so as to cover the window opening. The instrument can be moved with ease within the window opening and the stirring or turning over of food executed without any fear of spatters escaping out. Adding said rear draw strings 28, although not as preferred, assures total protection but at a sacrifice in ease of operation in requiring hands to tighten the draw strings and then loosening them in order to withdraw the inserted instrument.

What is claimed is:

1. The product of a spatter shielding and vapor venting device for mounting on a frying pan and covering the entire open area of said frying pan, said device comprising:
   (a) a vertical hollow cylindrical wall having an open top with a top rim, a vertical bottom flange and a peripheral horizontal flange attached to said wall near the bottom flange, an opening in the wall spaced above the horizontal flange and forming a window through said wall, a window cover having an outer periphery the same shape as and substantially the same size as the opening to completely cover the opening, and a transparent lid covering the open top of said wall,
   (b) said wall further having a handle attached to and extending radially outwardly from said wall, said handle being spaced from said opening,
   (c) said window cover is selected from the group consisting of a swinging cover with a hinged top edge, a curtain comprising a plurality of resilient vertically extending strips, and an open-ended fabric sleeve,
   (d) said lid further having an outer perimeter, a bottom side, a cylindrical flange extending from said bottom side and spaced inwardly from the perimeter, and a means to space the bottom of said lid and outside surface of said cylindrical flange from the top rim and inside wall of said hollow cylindrical wall to form a peripheral venting gap, wherein the means of spacing is selected from the group consisting of at least three radial ridges extending from said flange to the outer perimeter and at least three bumps on the top rim of said hollow cylindrical wall,
   (e) the improvement in which said peripheral horizontal flange being attached to the bottom rim of said hollow cylindrical wall and extending radially inwardly from said wall to the top rim of said vertical bottom flange,
   (f) whereby the improved shielding and venting device is placed onto the frying pan with the vertical bottom and peripheral horizontal flanges engaging the uppermost portion of the inner wall and the top wall of the pan respectively, the window cover allowing the insertion of a cooking instrument into the device to allow access to the pan interior without removal of the device from the pan and the peripheral venting gap allowing the pan to be vented without removal of the lid.

2. The shielding and venting device according to claim 1, wherein said window cover further has a door handle.

3. The shielding and venting device according to claim 1, wherein the width of said peripheral horizontal flange is extended to fit larger size frying pan with a size expansion adapter.

4. The product of a spatter shielding and vapor venting device for mounting on a frying pan and covering the entire open area of said frying pan, said device comprising:

(a) a vertical hollow cylindrical wall having an open top with a top rim, a vertical bottom flange and a peripheral horizontal flange attached to said wall near the bottom flange, an opening in the wall spaced above the horizontal flange and forming a window through said wall, a window cover having an outer periphery the same shape as and substantially the same size as the opening to completely cover the opening, and a transparent lid covering the open top of said wall, (b) said wall further having a handle attached to and extending radially outwardly from said wall, said handle being spaced from said opening, a horizontal plate attached to and extending radially inwardly from said wall and being located directly above said opening, (c) said window cover further having a hinged means top edge allowing said cover to swing open and close said opening, (d) said lid further having an outer perimeter, a bottom side, a cylindrical flange extending from said bottom side and spaced inwardly from the perimeter, and a means to space the bottom of said lid and outside surface of said cylindrical flange from said top rim and inside wall of said hollow cylindrical wall to form a peripheral venting gap, wherein the means of spacing is selected from the group consisting of at least three radial ridges extending from said flange to the outer perimeter and at least three bumps on the top rim of said hollow cylindrical wall, (e) the improvement in which said hinged means comprises of loop attached to said window cover and hanging on pin allowing said window cover rotational and vertical motions, wherein said pin is attached to surfaces selected from the group consisting of said horizontal plate above said opening and inside of said wall facing the ends of said pins.

(f) whereby the improved shielding and venting device is placed onto the frying pan with the vertical bottom and peripheral horizontal flanges engaging the uppermost portion of the inner wall and the top wall of the pan respectively, the window cover allowing the insertion of a cooking instrument into the device to allow access to the pan interior without removal of the device from the pan, the unique hinged means allowing the inserted cooking instrument to be withdrawn without getting wedged and stuck and the peripheral venting gap allowing the pan to be vented without removal of the lid.

5. The improved shielding and venting device according to claim 4, wherein at least two hinged systems are used with a common pin for all the loops.

6. The improved shielding and venting device according to claim 4, wherein the loop is selected from the group of closed and opened loops.

7. The improved shielding and venting device according to claim 4, wherein the loop is selected from the group of elongated and circular loops.

8. The improved shielding and venting device according to claim 4, wherein the loop is an integral part of said window cover.

* * * * *